June 21, 1932. H. T. COTTRELL 1,863,556
SELF ENGAGING REVERSE MOTION BRAKE
Filed July 21, 1927
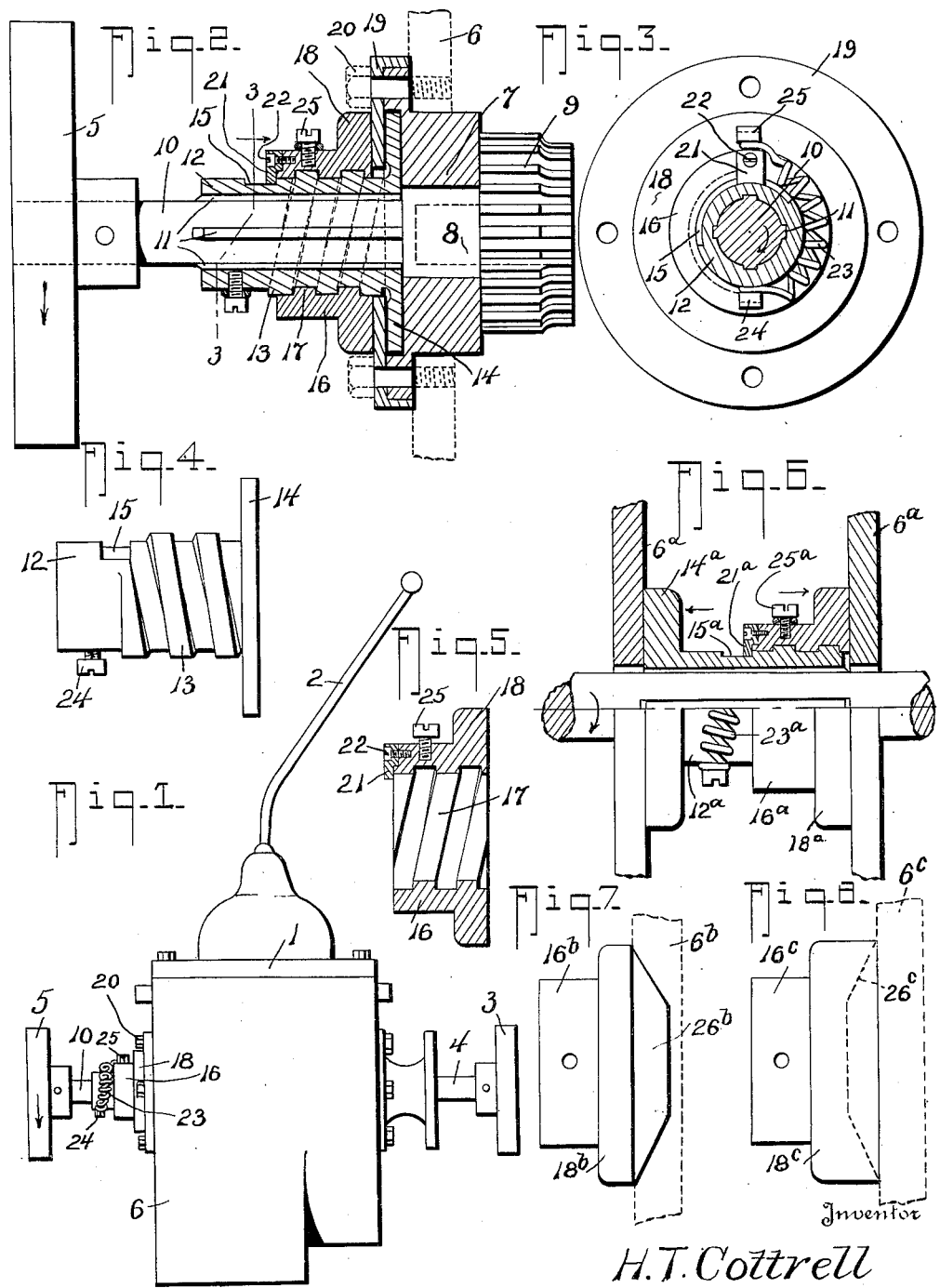
Inventor
H. T. Cottrell
By Albert E. Dieterich
Attorney Patented June 21, 1932

1,863,556

UNITED STATES PATENT OFFICE

HERBERT T. COTTRELL, OF VANCOUVER, BRITISH COLUMBIA, CANADA

SELF-ENGAGING REVERSE MOTION BRAKE

Application filed July 21, 1927. Serial No. 207,392.

This invention relates to a self-engaging reverse motion brake. Its object is to provide an emergency brake which functions by gravitational effect upon the vehicle and entirely without the intervention of the driver.

The invention is therefore in a special sense a safety brake and inasmuch as it utilizes gravity to arrest its effect upon the vehicle it is self-engaging dependent upon the required conditions.

The device is installed between the engine and the transmission gearing and in its essentials consists of a sleeve provided with a flange and keyed to the main drive shaft as regards circular motion but is free to slide longitudinally thereon. The exterior of the sleeve carries a screw-thread, usually left handed in direction. Engaging with this is a corresponding nut also carrying a flange matching the flange on the slidable sleeve, provision being made for a slight circular movement of the nut in relation to the screw upon the sleeve.

The two flanges aforesaid are adapted to engage between them a flat plate member which is rigid with the framework of the vehicle. It may if preferred, form part of the gear box.

The device is primarily intended to function during a traffic jam when ascending an incline. In such a case the vehicle is brought to rest in the ordinary way and the gear shift is put in low gear ready for starting.

Ordinarily the clutch is released and the service or emergency brake put into effect. It is an obvious and well recognized fact that this situation presents important difficulties particularly to inexperienced drivers inasmuch as either or both brakes must be released simultaneously with the application of the accelerator pedal and the engagement of the clutch. Unless this is skillfully done the vehicle tends and frequently does run backward, causing damage or disturbance to the traffic immediately behind it and in result frequently impelling the driver to sudden applications of power which are highly injurious to the driving mechanism.

Whereas by the use of my device with the clutch disengaged and the gear shift in the low gear position, should the vehicle commence a backward motion even to the extent of a few inches, the sleeve in engagement with the drive shaft immediately tightens its screw into the corresponding nut, thus firmly gripping the rigid cross member between the two flanges and totally arresting further motion of the drive shaft, and this without either the service or emergency brakes having been in operation.

In the converse case when the vehicle has to be re-started, immediately the clutch is allowed to engage the transmission shaft giving to it a forward motion, my safety brake flanges are instantly released from contact with the rigid cross member and the vehicle is free to proceed in the usual way, both flange members revolving together in the forward direction.

The invention is more clearly described by aid of the drawings herewith forming part of this application and in which:

Figure 1 is a side elevation of a transmission unit showing the manner of applying my invention.

Figure 2 is an enlarged vertical longitudinal section of my invention, the driving shaft of the transmission gear train, and the driving pinion thereof being shown in elevation.

Figure 3 is a cross section on the line 3—3 of Figure 2.

Figure 4 is a detail elevation of the threaded flanged sleeve member.

Figure 5 is a vertical longitudinal section of the threaded nut member.

Figure 6 is a part central longitudinal section and part elevation of a modification of the invention.

Figures 7 and 8 are side elevations of modifications herein again referred to.

In the drawings in which like numerals of reference indicate like parts in all of the figures, 1 is the cover of the gear box 6, 2 the gear shifting lever, 3 the coupling flange which connects the driven shaft 4 of the gear train to the propelling shaft that leads to the differential mechanism of the rear axle, the propelling shaft not being shown. 5 is the coupling flange which connects the driving shaft 10 of the gear train to the clutch mechanism of the invention (the clutch mechanism and engine not being shown).

In applying my invention to an automobile for instance it is applied to the driving shaft of the transmission gear train, being the shaft which connects to the clutch which controls the connection between the engine and the shaft 10, the clutch being, of course, of the ordinary construction as is also the shaft 10.

In the particular illustration shown in the drawings the shaft 10 has splines 11 which enter corresponding grooves in the flanged sleeve member 12 hereinafter again referred to. The shaft 10 also has a bearing portion 8 located in the non-rotatable shaft bearing 7 which is secured to the gear box by cap screws 20, the driving pinion of the transmission gear train being indicated by 9.

The flanged sleeve member 12 is externally threaded as at 13 and it is provided with a flange 14 and an arcuate seat 15.

16 designates the nut member which is internally threaded as at 17 to cooperate with the threads 13 and which is provided with a flange 18 to cooperate with the flange 14 as will later more fully appear.

19 is a rigid plate which is adapted to fit between the flanges 14 and 18 and cooperate with the same, the plate 19 being rigidly secured by the cap screws 20 to the transmission gear case 6.

21 is a rotation limiting key secured to the nut member 16 by a screw 22 and having bearing in the arcuate recess 15.

A spring 23 continuously tends to rotate the nut member 16 on the threaded sleeve in a direction to bring the opposing faces of the flanges 14 and 18 into contact with the rigid plate 19. The spring 23 is anchored at one end to a set screw 24 secured to the flanged sleeve 12 and at the other end it is anchored by set screws 25 to the nut member 16.

In the embodiment shown in the first five figures of the drawings the contacting faces of the flanges 14 and 18 lie in parallel planes normal to the axis of the shaft 10.

So far as described it will be observed that when the shaft 10 is being driven by the engine power it also turns in the direction of the arrow on the flange 5 in Figures 1 and 2. Turning in this direction, the tendency of the nut member 16 is to unscrew slightly, i. e., the tendency is to separate the opposing faces of the flanges 18 and 14 so that no holding friction or grasping effect is produced between the flanges 14 and 18 on the one hand and the rigid plate 19 on the other. However, when a slight reverse motion is imparted to the gear 9 the tendency of the threaded sleeve 12 is to screw into the nut member 16, thereby bringing the opposing faces of the flanges 13 and 14 into tight frictional engagement with the rigid plate 19 and hence lock the shaft 10 by retaining friction against turning backward. As soon, however, as power is again applied to the shaft 10 by throwing in the clutch and the shaft 10 is turned in the direction of the arrow in Figure 2, the frictional engagement is released and the driving power transmitted to the rear wheels of the vehicle.

It matters not whether the lever 2 has been shifted into low speed forward, intermediate speed forward or high speed forward, or in reverse, the action of the mechanism is precisely the same. For example, as a car embodying the invention is headed down grade and stopped with the reverse gear in mesh, should the car start coasting down, the flanges 14 and 18 will grip the plate 19 and hold the car against further movement, since the direction of rotation of the shaft 10 under driving power is always in the same direction. Therefore a forward motion of the vehicle with reverse gear in mesh would be the equivalent of reversing the direction of movement of the pinion 9 and that reverse motion will instantly cause the flanges 14 and 18 to grip the plate 19.

In the modification of the invention shown in Figure 6 the same reference numerals plus the index letter (a) indicate corresponding parts to those shown in Figure 2. In this embodiment the plates 6a—6a are rigidly secured and may be cross members of the frame of the vehicle. The shaft 10a under driving power always turns in the direction of the arrow on the shaft so that the instant a reverse force is applied to the shaft 10a the flanges 14a and 18a will be forced in the direction of the horizontal arrows in that figure, frictionally to engage the plates 6a—6a and lock the shaft.

Instead of the friction faces of the members 12 and 16 being plane surfaces they may be cone-shaped, either outwardly or inwardly as shown in Figures 7 and 8 at 26b and 26c respectively. In Figures 7 and 8 only the nut member is illustrated, it being obvious that the flange of the threaded sleeve may be similarly formed.

The provision of the members 21 and 15 is for the purpose of permitting a limited circumferential movement between the two members 12 and 16, and movement between the two members is modified by the action of the spring 23. This limited movement between the two members is merely sufficient to keep the clutching faces of the flanges 14 and 18 in approximately close relationship with the rigid member so that the brake action may be practically instantaneous on a reverse motion.

Having now particularly described my invention, what I claim and desire to be protected in by Letters Patent, is:

1. A brake mechanism adapted to arrest the rotation of the transmission drive shaft of an automotive vehicle and comprising, an externally screw-threaded sleeve provided with a flange having a flat face right-angular to the axis of said screw, said sleeve being slidable along and keyed to said shaft, a nut member having a right-angularly faced flange corresponding to and opposite the first said flange, said nut member having an internal screw-thread adapted to engage the thread of the said sleeve member, a flat faced member integral with the frame of said vehicle and adapted to resist the frictional engagement of the two said flanges, means independent of the shaft for retaining the said nut member upon the said sleeve, a resilient extension member secured between and uniting said sleeve and said nut.

2. A brake mechanism adapted to arrest the rotation of the transmission drive shaft of an automotive vehicle and comprising an externally screw-threaded sleeve provided with a flange lying at right angles to the axis of the screw and having a friction face, said sleeve being slidable along and keyed to said shaft, a nut member having a right-angularly-positioned flange provided with a friction face corresponding to and opposite the friction face of the first mentioned flange, said nut member having an internal screw-thread adapted to engage the thread of said sleeve member, a nonrotatable member adapted to project between the friction faces of said flanges and adapted to resist the frictional engagement of said flanges when said flanges are brought into contact with said nonrotatable member, means independent of the shaft for retaining said nut member upon the sleeve, and a spring secured one end to said sleeve and the other end to said nut member tending to screw the same together.

3. A brake mechanism adapted to arrest the rotation of the transmission drive shaft of an automotive vehicle and comprising an externally screw-threaded sleeve provided with a flange extending at right angles to the axis of the screw, and having a clutching surface lying transversely of the axis of the screw, said sleeve being slidable along and keyed to said shaft, a nut member mounted on the sleeve and having internal screw threads adapted to engage the threads of the sleeve and having a flange at right angles to the axis of the threads, said flange being provided with a clutching surface opposing that of the sleeve flange, a pair of plates fixedly held spaced apart against which the clutching surfaces of said flanges respectively engage, means independent of the shaft for retaining the nut member upon the sleeve and a spring secured to the nut member and sleeve and exerting its force in a direction tending to screw said nut member on said sleeve in a direction to cause said clutching surfaces of said flanges to approach said fixed plates.

In testimony whereof I affix my signature.

HERBERT T. COTTRELL.